(12) United States Patent
Tiesler et al.

(10) Patent No.: US 7,137,659 B2
(45) Date of Patent: Nov. 21, 2006

(54) CONSOLE LATCH ASSEMBLY

(75) Inventors: John M. Tiesler, Harrison Township, MI (US); Christopher P. Pattitoni, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/946,712

(22) Filed: Sep. 22, 2004

(65) Prior Publication Data

US 2006/0061119 A1    Mar. 23, 2006

(51) Int. Cl.
*B60N 3/12* (2006.01)
(52) U.S. Cl. .................................. 296/37.8; 296/37.12
(58) Field of Classification Search ............... 296/37.8, 296/37.1, 37.7, 24.34, 37.14
See application file for complete search history.

(56) References Cited

U.S. PATENT DOCUMENTS

| | | | | |
|---|---|---|---|---|
| 4,159,137 A | * | 6/1979 | Richter | 292/123 |
| 4,257,632 A | * | 3/1981 | DeStepheno | 292/263 |
| 4,270,668 A | | 6/1981 | Berfield | |
| 4,501,378 A | | 2/1985 | Berfield | |
| 5,050,922 A | * | 9/1991 | Falcoff | 296/37.8 |
| 5,100,015 A | | 3/1992 | Vanderstuyf | |
| 5,322,178 A | | 6/1994 | Foos | |
| 5,520,313 A | * | 5/1996 | Toshihide | 296/37.12 |
| 5,522,638 A | * | 6/1996 | Falcoff et al. | 296/37.8 |
| 5,755,350 A | | 5/1998 | Marthaler | |
| 5,868,448 A | * | 2/1999 | Izumo | 296/37.12 |
| 5,893,478 A | * | 4/1999 | Maruoka | 296/37.8 |
| 6,003,925 A | * | 12/1999 | Litke et al. | 296/37.8 |
| 6,062,623 A | * | 5/2000 | Lemmen | 296/37.8 |
| 6,116,675 A | * | 9/2000 | Iwasawa | 296/37.8 |
| 6,125,030 A | * | 9/2000 | Mola et al. | 296/37.8 |
| 6,142,333 A | * | 11/2000 | Sasamoto et al. | 220/264 |
| 6,176,385 B1 | | 1/2001 | Feese et al. | |
| 6,176,534 B1 | * | 1/2001 | Duncan | 296/37.8 |
| 6,276,737 B1 | * | 8/2001 | Cansfield et al. | 296/37.8 |
| 6,386,409 B1 | | 5/2002 | Cheney | |
| 6,575,528 B1 | * | 6/2003 | Tiesler et al. | 296/37.8 |
| 6,619,716 B1 | * | 9/2003 | Sturt | 296/37.8 |
| 6,669,260 B1 | * | 12/2003 | Clark et al. | 296/37.8 |
| 6,786,518 B1 | * | 9/2004 | Vitry | 292/165 |
| 6,824,185 B1 | * | 11/2004 | Tiesler et al. | 296/37.8 |
| 2003/0025339 A1 | * | 2/2003 | Vitry et al. | 292/213 |
| 2004/0020935 A1 | * | 2/2004 | Inari | 220/830 |

FOREIGN PATENT DOCUMENTS

| | | |
|---|---|---|
| DE | 196 12 066 A1 | 10/1997 |
| EP | 1197382 A1 | 4/2002 |
| WO | WO 01/12925 A1 | 2/2001 |
| WO | WO 01/79638 A1 | 10/2001 |

* cited by examiner

*Primary Examiner*—Kiran B. Patel
(74) *Attorney, Agent, or Firm*—Brooks Kushman P.C.

(57) ABSTRACT

An article holding assembly that is attachable to a mounting member includes a housing and a latch that is moveable with respect to the housing between first and second latch positions. The latch is engageable with the mounting member when the latch is in the first latch position to thereby attach the housing to the mounting member. Furthermore, the latch is disengageable from the mounting member when the latch is moved toward the second latch position. The assembly also includes a handle pivotably attached to the housing and selectively engageable with the latch for moving the latch between the first and second latch positions.

22 Claims, 2 Drawing Sheets

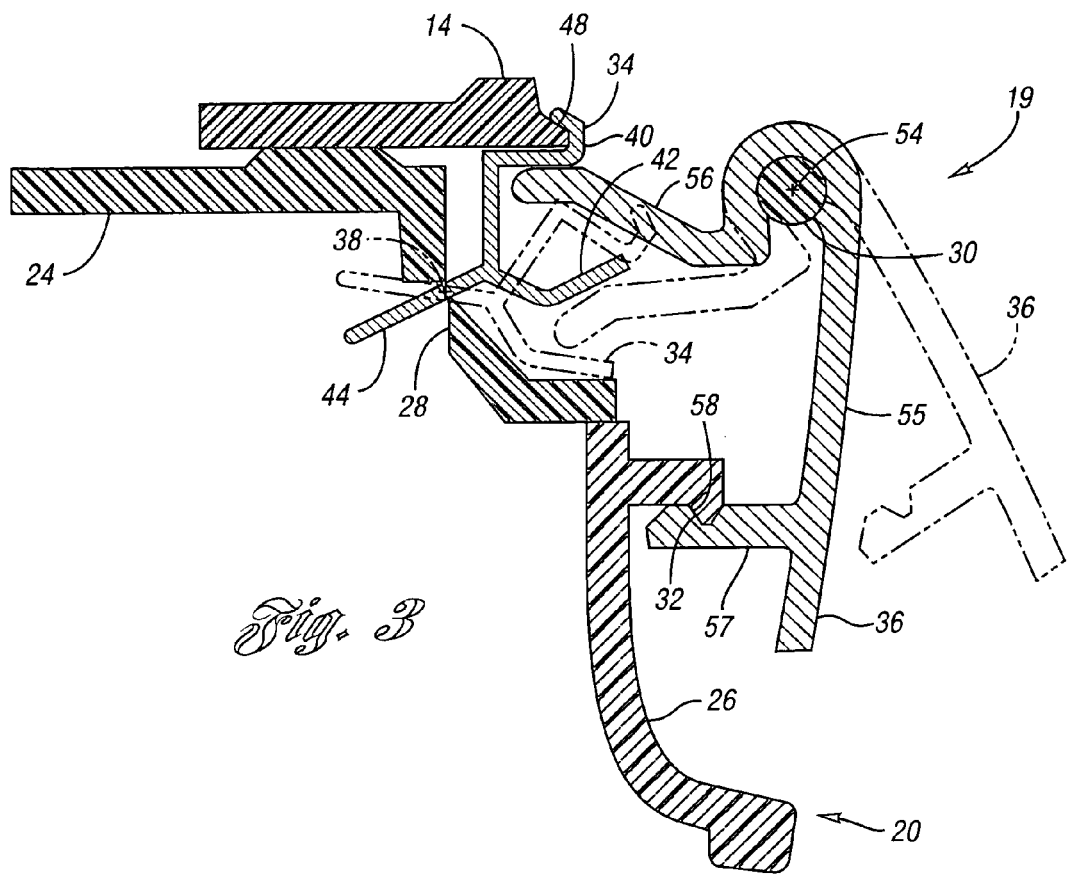
Fig. 3
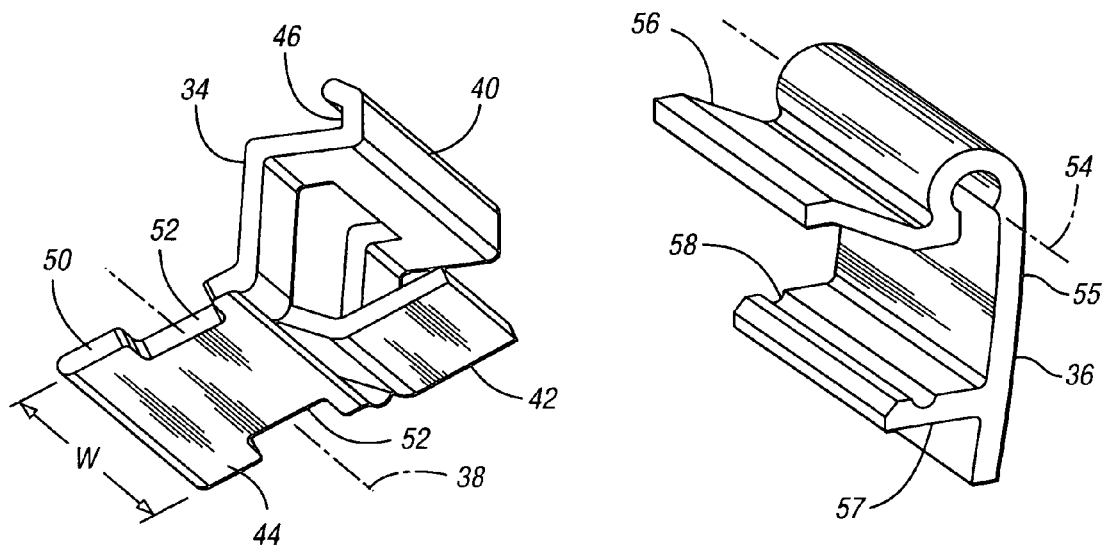
Fig. 4
Fig. 5

CONSOLE LATCH ASSEMBLY

BACKGROUND OF THE INVENTION

1. Field of the Invention

The invention relates to an article holding assembly having a latch subassembly.

2. Background Art

Article holding assemblies, such as console assemblies, may include fastening mechanisms that are configured for attachment to one or more mounting members. U.S. Pat. No. 6,669,260, for example, discloses holders for attaching a console module to a pair of rails.

SUMMARY OF THE INVENTION

Under the invention, an article holding assembly that is attachable to a mounting member includes a housing having a locking member. The assembly further includes a latch that is moveable with respect to the housing between first and second positions. The latch is engageable with the mounting member when the latch is in the first position to thereby attach the housing to the mounting member, and the latch is disengageable from the mounting member when the latch is moved toward the second position. The assembly also includes a handle pivotably attached to the housing and being engageable with the latch for moving the latch between the first and second positions. The handle is moveable between a locked position, in which the handle is engaged with the locking member, and an unlocked position, in which the handle is disengaged from the locking member. Furthermore, the handle is configured to retain the latch in the first position when the handle is in the locked position.

Further under the invention, a console assembly that is attachable to a mounting member in a vehicle is provided. The assembly includes a console body having a slot, a pivot member, and a locking member. The assembly further includes a latch that extends into the slot, and the latch is moveable with respect to the console body between first and second positions. When the latch is in the first position, the latch is engageable with the mounting member. The assembly also includes a handle pivotably attached to the pivot member and engageable with the latch for moving the latch between the first and second positions. The handle is moveable between a locked position, in which the handle is engaged with the locking member, and an unlocked position, in which the handle is disengaged from the locking member. Furthermore, the handle is configured to retain the latch in the first position when the handle is in the locked position.

Still further under the invention, an article holding assembly that is attachable to a mounting member includes a housing and a latch that is moveable with respect to the housing between first and second latch positions. The latch is engageable with the mounting member when the latch is in the first latch position to thereby attach the housing to the mounting member. Furthermore, the latch is disengageable from the mounting member when the latch is moved toward the second latch position. The assembly also includes a handle pivotably attached to the housing and selectively engageable with the latch for moving the latch between the first and second latch positions.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3 is a schematic cross-sectional view of the one module showing the latch subassembly in a latched position in solid lines and a unlatched position in phantom lines;

FIG. 4 is a perspective view of the latch of the latch subassembly; and

FIG. 5 is a perspective view of the handle of the latch subassembly.

DETAILED DESCRIPTION OF THE PREFERRED EMBODIMENT(S)

Figure 1:
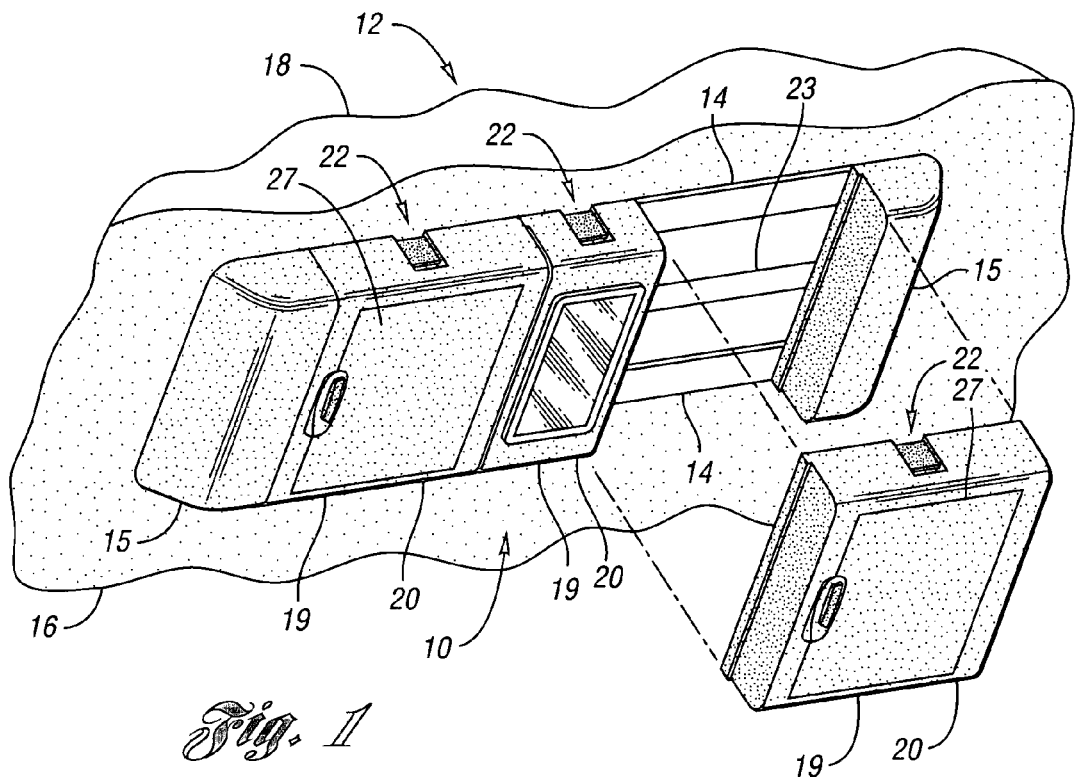
FIG. 1 is a perspective view of a console assembly according to the invention including multiple modules that are attachable to a pair of tracks.

FIG. 1 shows an article holding assembly, such as a console assembly 10, mounted in a vehicle 12. The console assembly 10 is removably attached to one or more mounting members, such as rails or tracks 14. In the embodiment shown in FIG. 1, the tracks 14 are attached to and extend between end caps 15, which are mounted to a headliner 16 and/or roof 18 of the vehicle 12. Alternatively, the tracks 14 may be mounted directly to the headliner 16 and/or roof 18.

The console assembly 10 includes one or more modules 19 removably attached to the tracks 14. Each module 19 includes a housing, such as a module body or console body 20, and one or more latch subassemblies 22 that are configured to removably attach the console body 20 to the tracks 14. Although only one latch subassembly 22 is visible on each console body 20 in FIG. 1, an additional latch subassembly 22 is disposed on an opposite side of each console body 20.

Each console body 20 may be configured to support and/or receive one or more articles. For example, each console body 20 may be a storage receptacle that is configured to store sunglasses, maps, garage door openers, or other articles. As another example, each console body 20 may be configured to support or house electronic equipment, such as a light, a digital video disc player, a display monitor or screen, audio equipment, a universal garage door opener, or any other suitable device. In that regard, the console assembly 10 may include one or more electrical contacts (not shown) attached to one or more console bodies 20 for contacting and receiving electrical power from a power source, such as power strip 23.

Figure 2:
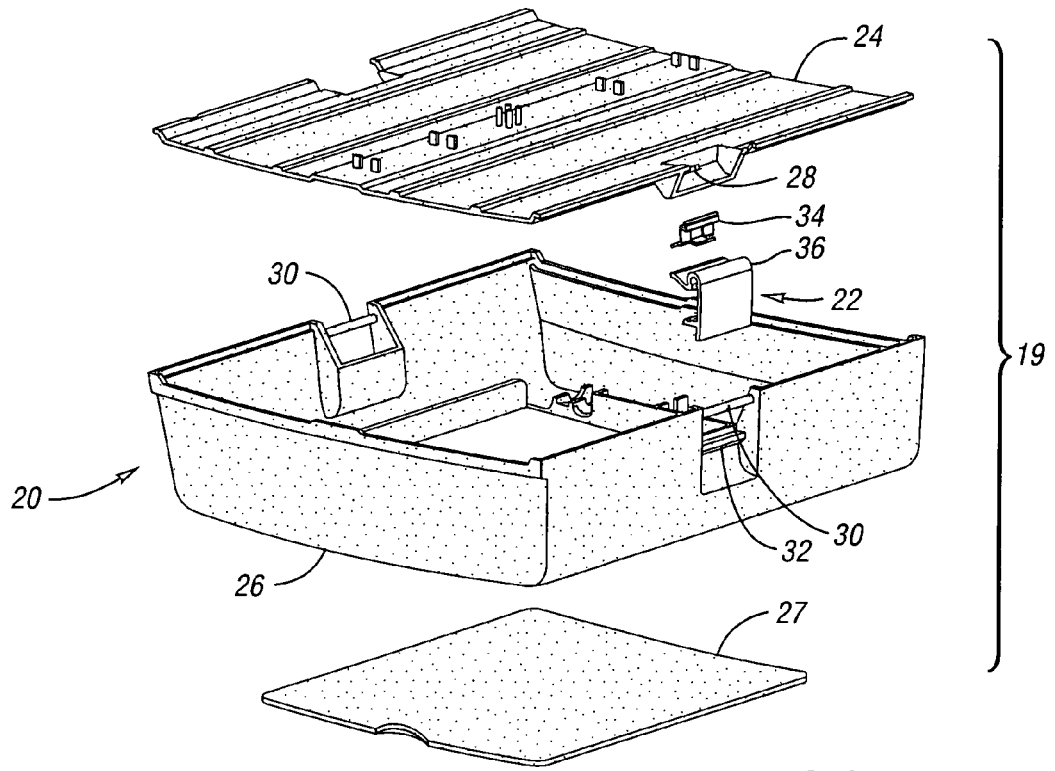
FIG. 2 is an exploded view of one module showing a latch subassembly that includes a latch and a handle for moving the latch.

Referring to FIGS. 2 and 3, a detailed description of one of the console bodies 20 will now be provided. The console body 20 shown in FIGS. 2 and 3 includes a base portion 24, a main portion such as a bezel 26 attached to the base portion 24, and a cover 27 pivotably attached to the bezel 26. The base portion 24 includes one or more openings, such as slots 28, that are each configured to receive a portion of a respective latch subassembly 22, as explained below in detail. The bezel 26 includes one or more pivot members, such as pivot rods 30, and one or more locking members 32 for inhibiting movement of the latch assemblies 22.

Referring to FIGS. 2–5, a detailed description of one of the latch subassemblies 22 will now be provided. The latch subassembly 22 includes a latch 34 and a handle 36 that are each moveably attached to the console body 20. The latch 34 extends into a respective slot 28 and is configured to pivot, toggle, or otherwise move between a first latch position, shown in solid lines in FIG. 3, and a second latch position, shown in phantom lines in FIG. 3. Generally, the latch 34 is moveable in any suitable manner toward and away from the track 14. In the embodiment shown in the Figures, the latch 34 is configured to pivot or toggle generally about a first pivot axis 38. Furthermore, the first pivot axis 38 may be stationary or moveable. For example, the position of the first pivot axis 38 may change as a result of sliding movement of the latch 34 with respect to the slot 28.

In the embodiment shown in the Figures, the latch 34 includes first, second and third legs or tabs 40, 42 and 44, respectively. The first and second tabs 40 and 42, respectively, are engageable with the handle 36, as explained below in detail. The first tab 40 also defines a recess or groove 46 that is configured to engage a lip 48 on a respective track 14 to secure the console body 20 to the track 14. The third tab 44 has a flange portion 50 and one or more notches 52 that facilitate insertion of the third tab 44 into the slot 28. With such a configuration, the third tab 44 may be inserted into the slot 28 at an angle, and then rotated to a generally horizontal position such that the notches 52 are disposed in the slot 28. The flange portion 50 has a width W that is wider than the width of the slot 28, such that the flange portion 52 retains the third tab 44 in the slot 28 while still allowing movement of the latch 34 with respect to the console body 20.

The handle 36 is pivotably attached to the bezel 26 and is moveable about a second pivot axis 54 between a first handle position, shown in solid lines in FIG. 3, and a second handle position, shown in phantom lines in FIG. 3. For example, the handle 36 may be snapped onto the pivot rod 30.

The handle 36 has a main body 55 and first and second extensions 56 and 57, respectively, extending from the main body 55. The first extension 56 is selectively engageable with the first and second tabs 40 and 42, respectively, of the latch 34, such that the handle 36 is operative to move the latch 34 between the first and second latch positions when the handle 36 is moved between the first and second handle positions. The second extension 57 has a locking feature 58 that is engageable with a respective locking member 32 of the console body 20, to thereby lock the handle 36 in the first handle position. The first and second handle positions may therefore be referred to as locked and unlocked positions, respectively.

While the locking member 32 and locking feature 58 may have any suitable configuration for inhibiting movement of the handle 36 upon engagement with each other, in the embodiment shown in the Figures, the locking member 32 is formed as a projection, and the locking feature 58 is formed as a recess that receives the projection. As another example, the locking member 32 may be formed as a recess, and the locking feature 58 may be formed as a projection.

Referring to FIG. 3, operation of the console assembly 10 will now be described. The handle 36 may be moved manually between the first and second handle positions to thereby move the latch 34 between the first and second latch positions. When the handle 36 is in the first handle position, the first extension 56 is engaged with the first tab 40 of the latch 34, and the locking feature 58 is engaged with the locking member 32 of the console body 20. As a result, the handle 36 functions to retain the latch 34 in the first latch position. When the latch 34 is in the first latch position, the first tab 40 engages the track 14 to secure the console body 20 to the track 14.

Upon pivoting the handle 36 in a first direction about the pivot rod 30, the handle 36 disengages the locking member 32 and the first tab 40, and engages the second tab 42 to thereby move the latch 34 from the first latch position toward the second latch position. As a result, the latch 34 pivots in a second direction opposite the first direction, and the first tab 40 disengages the track 14.

If the particular module 19 includes more than one latch subassembly 22, each latch subassembly 22 may be operated in a similar manner. When all latch subassemblies 22 are disengaged from the tracks 14, the console body 20 may be removed from and/or repositioned along the tracks 14. The handle 36 of each latch subassembly 22 may then be moved to the first handle position to thereby secure the console body 20 in any desired position on the tracks 14.

The latch subassemblies 22 of the invention provide a relatively simple and effective means to attach the modules 19 to the tracks 14 and to inhibit sliding of the modules 19 along the tracks 14. Moreover, each latch 34 and each handle 36 may comprise any suitable materials and may be made in any suitable manner. For example, each latch 34 may be formed of stamped sheet metal, such as zinc plated steel, and each handle 36 may be made of extruded or molded plastic, such as polypropylene.

Furthermore, with the configuration described above, each latch subassembly 22 may be provided without a spring to reduce the number of components involved. Alternatively, each latch subassembly 22 may be provided with a spring for urging the associated latch 34 or handle 36 in a particular direction. For example, each latch assembly 22 may include a torsion spring (not shown) that is engaged with the handle 36 for urging the handle 36 toward the first handle position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An article holding assembly that is attachable to a mounting member, the assembly comprising:
   a housing having a locking member;
   a latch that is moveable with respect to the housing between first and second positions, wherein the latch is engageable with the mounting member when the latch is in the first position to thereby attach the housing to the mounting member, and the latch is disengageable from the mounting member when the latch is moved toward the second position, such that the housing is removable from the mounting member; and
   a handle pivotably attached to the housing and being engageable with the latch for moving the latch between the first and second positions, the handle being moveable between a locked position, in which the handle is engaged with the locking member, and an unlocked position, in which the handle is disengaged from the locking member, wherein the handle is configured to retain the latch in the first position when the handle is in the locked position.

2. The assembly of claim 1 wherein the latch is generally pivotable about a first axis, and the handle is generally pivotable about a second axis that is spaced away from the first axis.

3. The assembly of claim 2 wherein the first and second axes are generally parallel.

4. The assembly of claim 2 wherein the handle is configured to pivot generally in a first direction to thereby cause the latch to pivot generally in a second direction opposite the first direction.

5. The assembly of claim 1 wherein the housing has a pivot member, and the handle is snapped onto the pivot member.

6. The assembly of claim 1 wherein the housing has an opening, and the latch extends into the opening.

7. The assembly of claim 1 wherein the latch has first and second tabs, the handle is configured to engage the first tab when the handle is moved toward the locked position, and the handle is configured to engage the second tab when the handle is moved toward the unlocked position.

8. The assembly of claim 7 wherein the housing has an opening, and the latch has a third tab that extends into the opening.

9. The assembly of claim 1 wherein the handle has a recess for receiving the locking member when the handle is in the locked position.

10. The assembly of claim 1 wherein the latch is configured to engage a lip of the mounting member.

11. A console assembly that is attachable to a mounting member in a vehicle, the assembly comprising:
    a console body having a locking member;
    a latch that is moveable with respect to the console body between first and second positions, wherein the latch is engageable with the mounting member when the latch is in the first position; and
    a handle pivotably attached to the console body and being engageable with the latch for moving the latch between the first and second positions, the handle being moveable between a locked position, in which the handle is engaged with the locking member, and an unlocked position, in which the handle is disengaged from the locking member, wherein the handle is configured to retain the latch in the first position when the handle is in the locked position;
    wherein the latch has first and second portions, the handle is configured to engage the first portion when the handle is moved toward the locked position, and the handle is configured to engage the second portion when the handle is moved toward the unlocked position.

12. The assembly of claim 11 wherein the latch is generally pivotable about a first axis, and the handle is generally pivotable about a second axis that is spaced away from the first axis.

13. The assembly of claim 12 wherein the first and second axes are generally parallel.

14. The assembly of claim 12 wherein the handle is configured to pivot generally in a first direction to thereby cause the latch to pivot generally in a second direction opposite the first direction.

15. The assembly of claim 11 wherein the first and second portions of the latch comprise first and second tabs, respectively.

16. The assembly of claim 11 wherein the handle has a recess for receiving the locking member when the handle is in the locked position.

17. The assembly of claim 11 wherein the latch is configured to engage a lip of the mounting member.

18. An article holding assembly that is attachable to a mounting member, the assembly comprising:
    a housing having a locking member;
    a latch that is moveable with respect to the housing between first and second latch positions, wherein the latch is engageable with the mounting member when the latch is in the first latch position to thereby attach the housing to the mounting member, and the latch is disengageable from the mounting member when the latch is moved toward the second latch position, such that the housing is repositionable along the mounting member; and
    a handle pivotably attached to the housing and being engageable with the latch for moving the latch between the first and second latch positions, the handle being moveable between a locked position, in which the handle is engaged with the locking member, and an unlocked position, in which the handle is disengaged from the locking member, wherein the handle is configured to retain the latch in the first position when the handle is in the locked position.

19. The assembly of claim 18 wherein the latch is generally pivotable about a first axis, and the handle is generally pivotable about a second axis that is spaced away from the first axis.

20. The assembly of claim 18 wherein the latch has first and second tabs, and the handle is selectively engageable with the tabs to thereby move the latch between the first and second latch positions, and wherein the handle is configured to engage the first tab when the handle is moved toward the locked position, and the handle is configured to engage the second tab when the handle is moved toward the unlocked position.

21. The assembly of claim 1 wherein the housing is repositionable along the mounting member when the latch is disengaged from the mounting member.

22. The assembly of claim 11 wherein the console body has a slot, and the latch has a third portion that extends into the slot such that the latch is moveable with respect to the console body.

* * * * *